(12) United States Patent
Ruple

(10) Patent No.: X7072
(45) Date of Patent: May 19, 1832

(54) WINNOWING MILL, MACHINERY

(76) Inventor: James Ruple

James Ruple of Washington, State of Pennsylvania.

Letters Patent.

The schedule referred to in these Letters Patent and making part of the same containing a description in the words of the said James Ruple himself of his improvement in the machinery of Winnowing Mills.

To all to whom these presents shall come

Be it known that I James Ruple of Washington, Washington County, State of Pennsylvania have invented a new and useful improvement in the machinery of Winnowing Mills for the purpose of cleaning grain from chaff, cockle, cheat &c and that the following is an exact description of the construction and operation of the said machine as improved by me.

The body of the mill is formed by making two sides, each to be from five to six feet in length, and from three to three feet six inches deep, the back part of the sides formed in a half circle and covered with a hoop, or boards nailed on the outer part of the circle; this circle to be from two feet six inches to three feet in diameter, cut an air hole in the centre of the circle in the mill sides, of from sixteen to eighteen inches in diameter; make a back and front frame of small scantling, the frame to be about two feet two inches between the upright posts, the post to be about four feet long with a cross rail at the top and bottom, in these frames fasten the sides, place the frames about three feet apart, the back frame to cover the centre of the before mentioned circle; on the right hand side of the back frame, place an additional upright post so as to admit the cast wheel to run between the posts; make a fan shaft, two feet two inches in length, and two & a half inches square; in one end of this shaft insert a gudgeon, projecting about six inches, and in the middle of the projecting part of the gudgeon, fasten a small pinion, about three & a half inches in diameter, that will work in a cog wheel, above which must be four times as large as the pinion in the other end of the shaft a gudgeon is inserted, projecting two and a half inches upon which a crank one and a half inch is made, place this shaft in the posts of the back frame in the centre of the aforesaid circle, and in the shaft, there are fans to be placed of a suitable size, to play inside of the circle or drum; [illegible] a small shaft, about two feet in length, with round tenons upon each end, the brown to be put in brackets and fastened to the left side of the mill three inches back of the front frame, upon this small shaft place three pitman cranks, the top one to give motion to the shoe, the middle one to receive a stretcher from the crank on the fan shaft the lower one to give motion to the screen below the shoe from the shaft by means of the aforesaid stretcher the shoe and screen (hereafter described) is put in motion, make the shoe three feet in length, the back part to be four inches wide, with a board one foot seven inches wide nailed on the bottom, inclined forward, the front part one foot wide, with grooves cut in the sides to receive the riddles, the shoe about one foot seven inches wide; on the top of the shoe and five inches from the fore end, fasten a strip one and a fourth inch square; one foot seven inches from the front frame, and four inches from the top of the sides, place a piece of board, across the mill; with a pin in the centre; make a hole in the back part of the shoe bottom, and suspend the shoe by placing it upon the cross strip at the back part, and a strap fasten ed to the front strip, and the top rail of the front-frame, fasten a piece of iron in the shoe opposite the upper pitman crank, on the small shaft, & attach it to the same; make a screen, one foot eight inches wide, and five feet long, with side pieces, one inch square, the end piece at the top, to be six inches wide, and the bottom piece one feet wide, cover it with cockle, and chess screening, rest the bottom upon the cross rail of the back frame, near the lower part of the mill, put a pin in the lower cross piece of the screen frame, to rest in a mortice in the cross rail to support the screen; suspend the screen in front, below the riddles in the shoe, through which the grain passes, giving it a sufficient inclination, to insure the passage of the grain, and discharge it at the back end of the mill, thus discharging the chaff, at one end and the grain at the other end, fasten a piece of iron on one side of the screen frame four inches long & one broad, with a joint in it near the screen frame, and a pin in the outer end to fit in a hole in the lower pitman crank, on the small shaft; thus when the mill is put in motion the shoe and screen will shake from one side of the mill, to the other, and strips should be placed under the shoe, to prevent the grain from scattering over the sides of the screen, when it is shaking; the screenings are received in a box, formed by boarding the bottom of the mill, with a slide in front; place a hopper on the top of the mill, over the bottom board of the shoe; close the crevices with boards fitted to the hopper, when the screen is not to be used, take it out of the mill, and place a slide board upon strips or grooves, cut in the sides of the mill.

to discharge the grain at the back part of the mill.

Fasten a crank one foot long upon the outer end of the gudgeons, in the large cog wheel and upon this crank put a handle and by turning the crank, the whole machinery is put in motion, P. S. On the sides of the screen frame, and twenty one inches from the bottom of the frame, nail on blocks of such width that by shaking the screen, they will strike the sides of the mill, and give the screen the same motion at the bottom that it has at the top

What I claim as new, and of my own invention or discovery, in the above described machine, and for the use of which I claim an exclusive privilege, is the formation of the screen and the manner of shaking and using it; and the cant boards under the shoe to prevent the grain from scattering.

Witnesses
James B. Ruple
John Marshel

James Ruple, 1168 nos

E o.
Ch.J.W.